(12) United States Patent
Ash

(10) Patent No.: US 6,852,060 B1  
(45) Date of Patent: Feb. 8, 2005

(54) GEAR ASSEMBLY

(76) Inventor: Adrian Ash, 7 Somerville Road Poulner, Ringwood Hampshire (GB), BH24-1XJ ( * ) Notice: Subject to any disclaimer, the term of this patent is extended or adjusted under 35 U.S.C. 154(b) by 0 days.

(21) Appl. No.: 10/129,050

(22) PCT Filed: Oct. 30, 2000

(86) PCT No.: PCT/GB00/04170

§ 371 (c)(1), (2), (4) Date: Aug. 8, 2002

(87) PCT Pub. No.: WO01/33104

PCT Pub. Date: May 10, 2001

(30) Foreign Application Priority Data

Oct. 30, 1999 (GB) .............................................. 9925724

(51) Int. Cl.[7] .............................................. F16H 3/44
(52) U.S. Cl. ........................ 475/296; 475/269; 475/271; 475/275; 475/276; 475/277; 475/278; 475/323; 74/332; 74/333; 74/337.5; 280/259; 280/260; 280/261
(58) Field of Search ........................ 74/332, 333, 337.5; 475/269, 296, 271, 275, 323, 276, 277, 278, 279; 280/259, 260, 261

(56) References Cited

U.S. PATENT DOCUMENTS

| | | | |
|---|---|---|---|
| 1,256,371 A | * | 2/1918 | Rowledge .................... 475/277 |
| 3,290,962 A | * | 12/1966 | McCann et al. ............ 475/132 |
| 3,728,912 A | * | 4/1973 | Darnell ...................... 475/290 |
| 3,842,691 A | | 10/1974 | Shea |
| 4,559,848 A | * | 12/1985 | Kerr ............................ 475/276 |
| 4,721,015 A | * | 1/1988 | Hartmann ................... 475/277 |
| 4,858,494 A | | 8/1989 | Healy |
| 5,322,487 A | * | 6/1994 | Nagano ....................... 475/297 |
| 6,048,287 A | * | 4/2000 | Rohloff ....................... 475/297 |
| 6,387,008 B1 | * | 5/2002 | Chen et al. ................. 475/296 |
| 6,390,487 B1 | * | 5/2002 | Yoo ............................ 280/237 |

FOREIGN PATENT DOCUMENTS

| | | | | |
|---|---|---|---|---|
| DE | 4124306 A1 | * | 1/1993 | ............ B62M/1/02 |
| FR | 916 462 A | | 12/1946 | |
| FR | 2 684 064 A | | 5/1993 | |

* cited by examiner

Primary Examiner—Roger Pang  
Assistant Examiner—David D. Lee  
(74) Attorney, Agent, or Firm—Hogan & Hartson L.L.P.

(57) ABSTRACT

A planetary gear assembly comprising a primary array (2) of co-axial planetary gear sets and a secondary array (3) of co-axial planetary gear sets, planetary gear set being provided with an associated gear engagement means (21), the arrangement being such that in use each planetary gear set and the associated gear engagement means are arranged for relative translational movement which is substantially parallel to the axis of the respective array of planetary gears and a rotational input drives a selected primary gear set which is engaged with the associated gear engagement means, the rotational output of the engaged primary gear set (2) being transmitted through the associated gear engagement means (21) to gear engagement means which is engaged with the associated selected secondary gear set (3), the output from the selected secondary gear set being transmitted to rotational output means (18, 49).

20 Claims, 10 Drawing Sheets

GEAR ASSEMBLY

Figure 1:
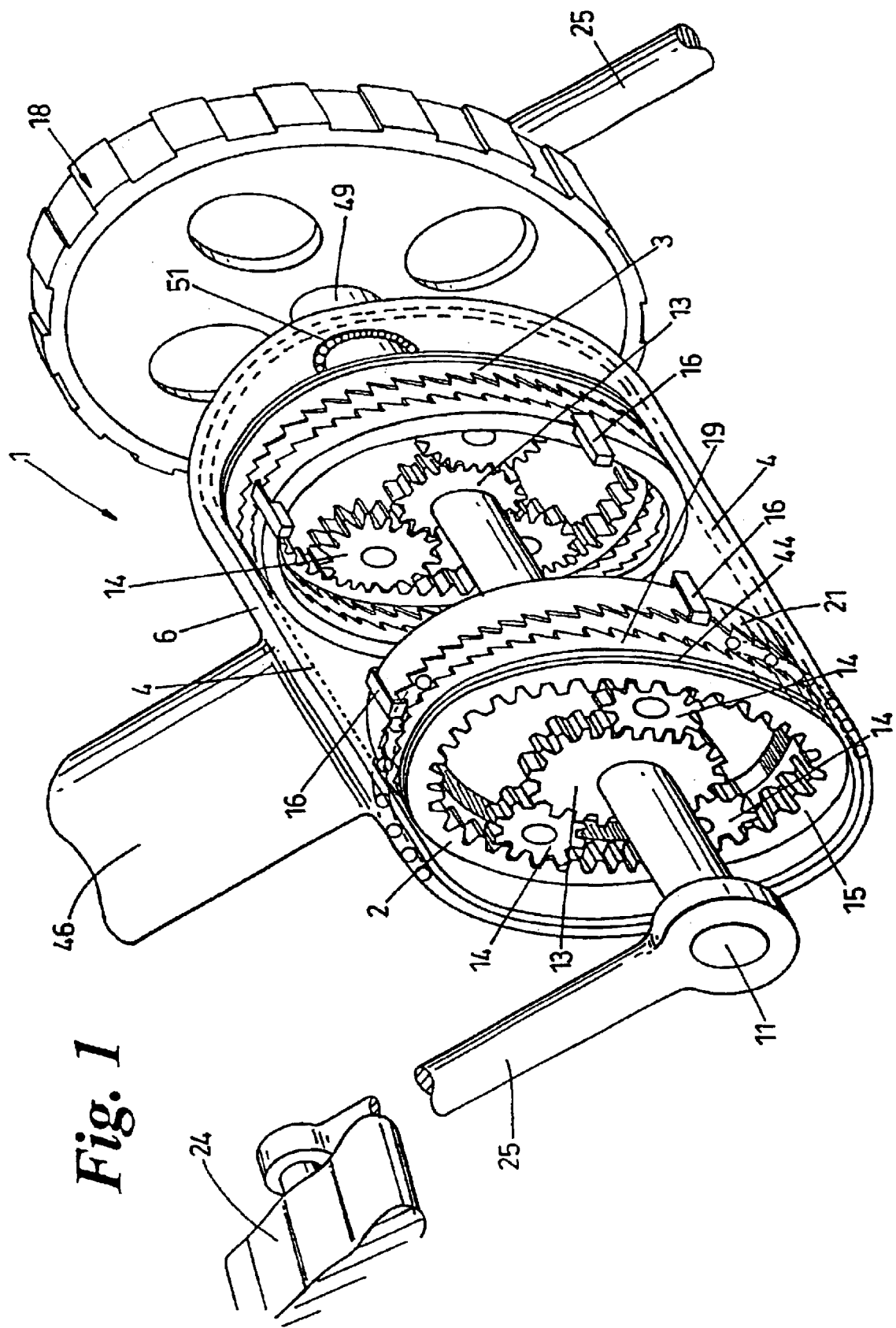

The present invention relates to gear assemblies and in particular, but not exclusively, to planetary gear assemblies for bicycles.

A known planetary gear assembly is disclosed in FR 2684064 (BOURDILLON) which comprises a plurality of primary planetary gear sets which is coaxial with a plurality of secondary planetary gear sets. Each of the planet cogs are mounted on a 'cage' (5) having a stepped profile, and the planet cogs and the cage are adapted to rotate about the axis of the crank shaft. In use it is the cage which rotates and transfers the torque from a selected primary planetary gear set to a selected secondary planetary gear set.

The present invention seeks to provide an alternative planetary gear assembly.

According to a first aspect of the invention there is provided a planetary gear assembly comprising primary planetary gear means and secondary planetary gear means, one of said primary planetary gear means and said secondary planetary gear means comprising a planetary gear set and the other of said primary planetary gear means and said secondary planetary gear means comprising a plurality of co-axial planetary gear sets, selection means for selecting one of the plurality of co-axial planetary gear sets, the assembly being characterised in that the assembly further comprises a rotatable housing which is mounted for rotation around the planetary gear sets, the arrangement of the assembly being such that, in use, a rotational input drives the primary planetary gear means, the output from the primary planetary gear means being transmitted to the rotatable housing, and the output from rotatable housing driving the secondary planetary gear means, and the output from the secondary planetary gear means being transmitted to a rotational output means.

Preferably the primary planetary gear means comprises a primary array of planetary gear sets and the secondary planetary gear means comprises a secondary array of planetary gear sets, selection means for selecting a primary planetary gear set and selection means for selecting a secondary planetary gear set, and in use the arrangement is such that a rotational input drives a selected primary planetary gear set, the output from the selected primary planetary gear set being used to drive the selected secondary planetary gear set and the output from the selected secondary planetary gear set being transmitted to a rotational output means.

Preferably the primary planetary gear means is co-axial with the secondary planetary gear means.

Preferably the rotatable housing is substantially cylindrical.

The housing preferably substantially encloses the primary and secondary planetary gear means.

The planetary gear assembly may be a bicycle planetary gear assembly in which foot pedals drive the primary gear means and the output from the secondary gear means is used to drive a drive cog.

According to a second aspect of the invention there is provided a planetary gear assembly comprising primary planetary gear means and secondary planetary gear means, one of said primary planetary gear means and said secondary gear means comprising a planetary gear set and the other of said primary planetary gear means and said secondary planetary gear means comprising a plurality of co-axial planetary gear sets, and the assembly further comprising gear engagement means associated with each of said plurality of co-axial gear sets, the assembly being characterised in that the gear engagement means and the plurality of planetary gear sets being arranged for relative translational movement in a direction which is substantially parallel to the axis of the plurality of the planetary gear sets, and the arrangement of the planetary gear assembly being such that, in use, the relative translation movement brings a planetary gear set into engagement with a respective gear engagement means, and said gear engagement means acts at least in part as a rotational transmission means between a primary gear set and a secondary gear set.

Preferably the assembly comprises caming means which is operative to cause the relative translational movement of a planetary gear set and an associated gear engagement means.

The caming means is preferably adapted to effect the relative translational movement of a planetary gear set and an associated gear engagement means by a rotational movement of the caming means.

The assembly desirably comprises a rack and pinion arrangement and in use suitable movement of the rack effects rotation of the pinion which causes the relative translational movement of a planetary gear set and a respective gear engagement means.

The assembly most preferably comprises a rack and pinion arrangement, the pinion being connected to the caming means, and in use, movement of the rack effects rotation of the pinion which causes rotation of the caming means.

The rack is preferably arcuate. In this case rotation of the rack causes rotation of the pinion. The pinion is preferably connected to the caming means by shaft means which extends into the planetary gear assembly.

The assembly preferably comprises a rack and pinion arrangement corresponding to each planetary gear set.

In a preferred embodiment of the invention there is provided a planetary gear assembly comprising a primary array of coaxial planetary gear sets and a secondary array of coaxial planetary gear sets, each planetary gear set being provided with an associated gear engagement means, the arrangement being such that in use each planetary gear set and the associated gear engagement means are arranged for relative translational movement in a direction which is substantially parallel to the axis of the respective array of planetary gears and a rotational input drives a selected primary gear set which is engaged with the associated gear engagement means, the rotational output of the engaged primary gear set being transmitted through the associated gear engagement means to gear engagement means which is engaged with the associated selected respective secondary gear set, the output from the selected secondary gear set being transmitted to rotational output means.

Figure 2:
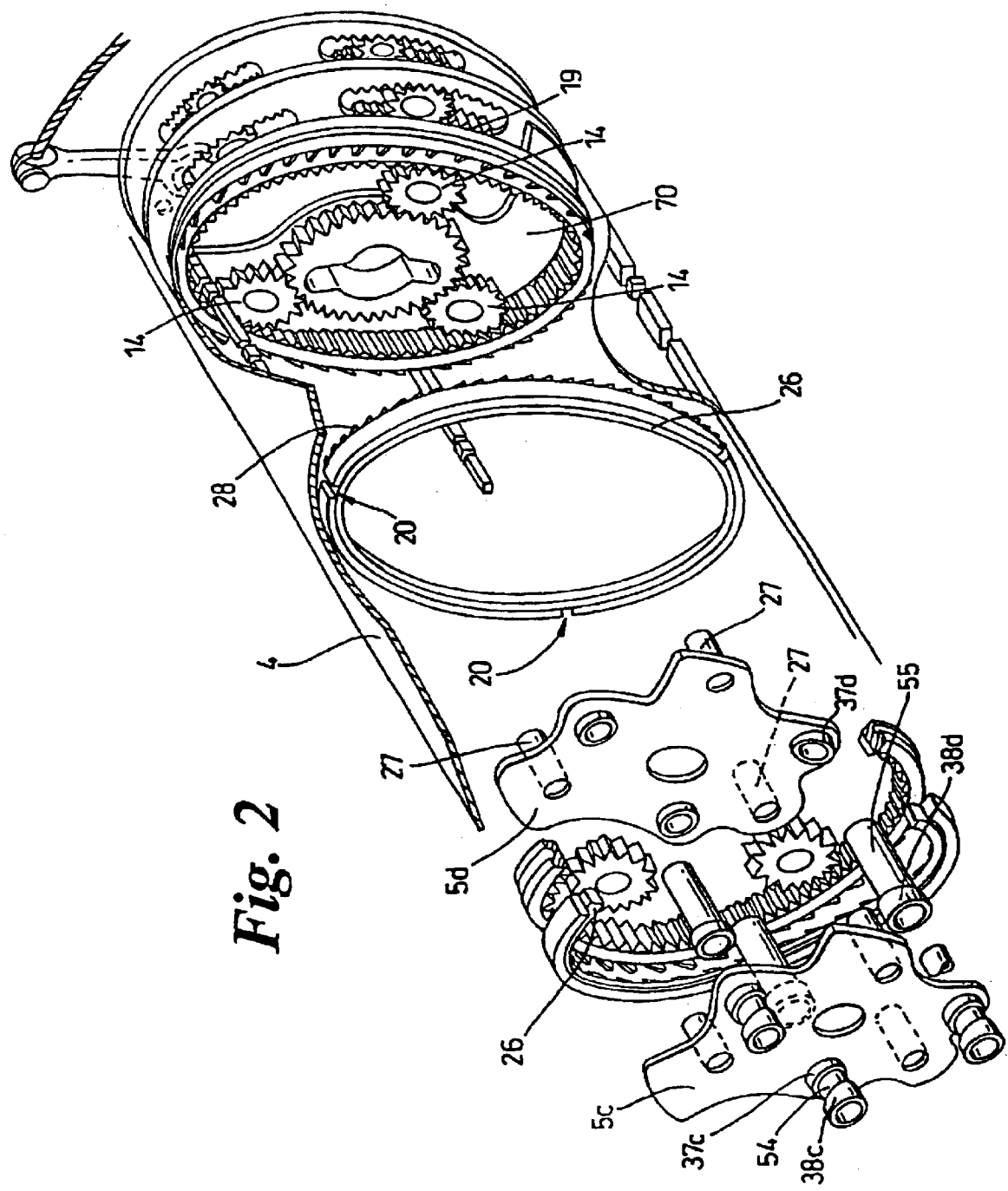
Figure 3:
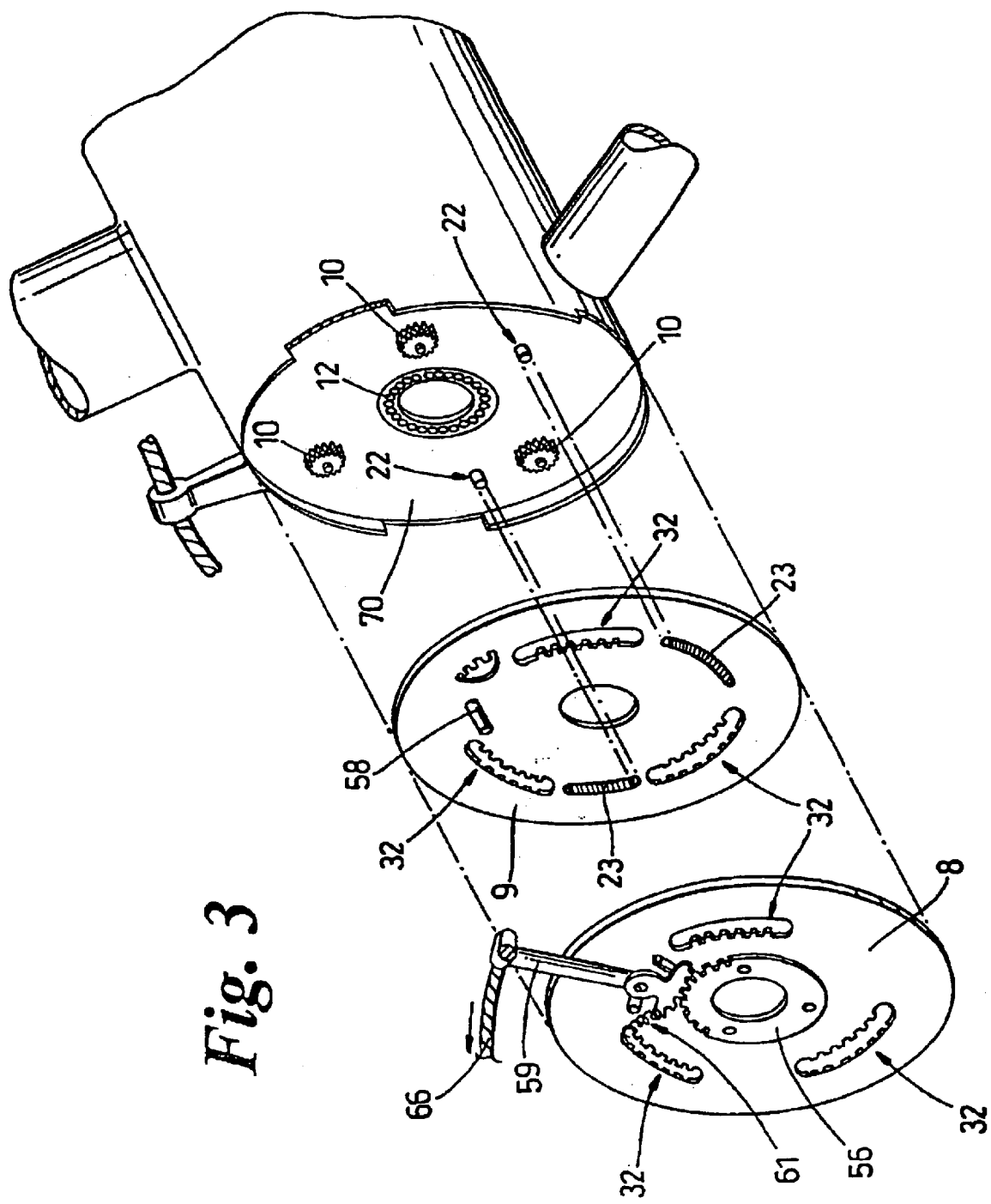
Figure 4:
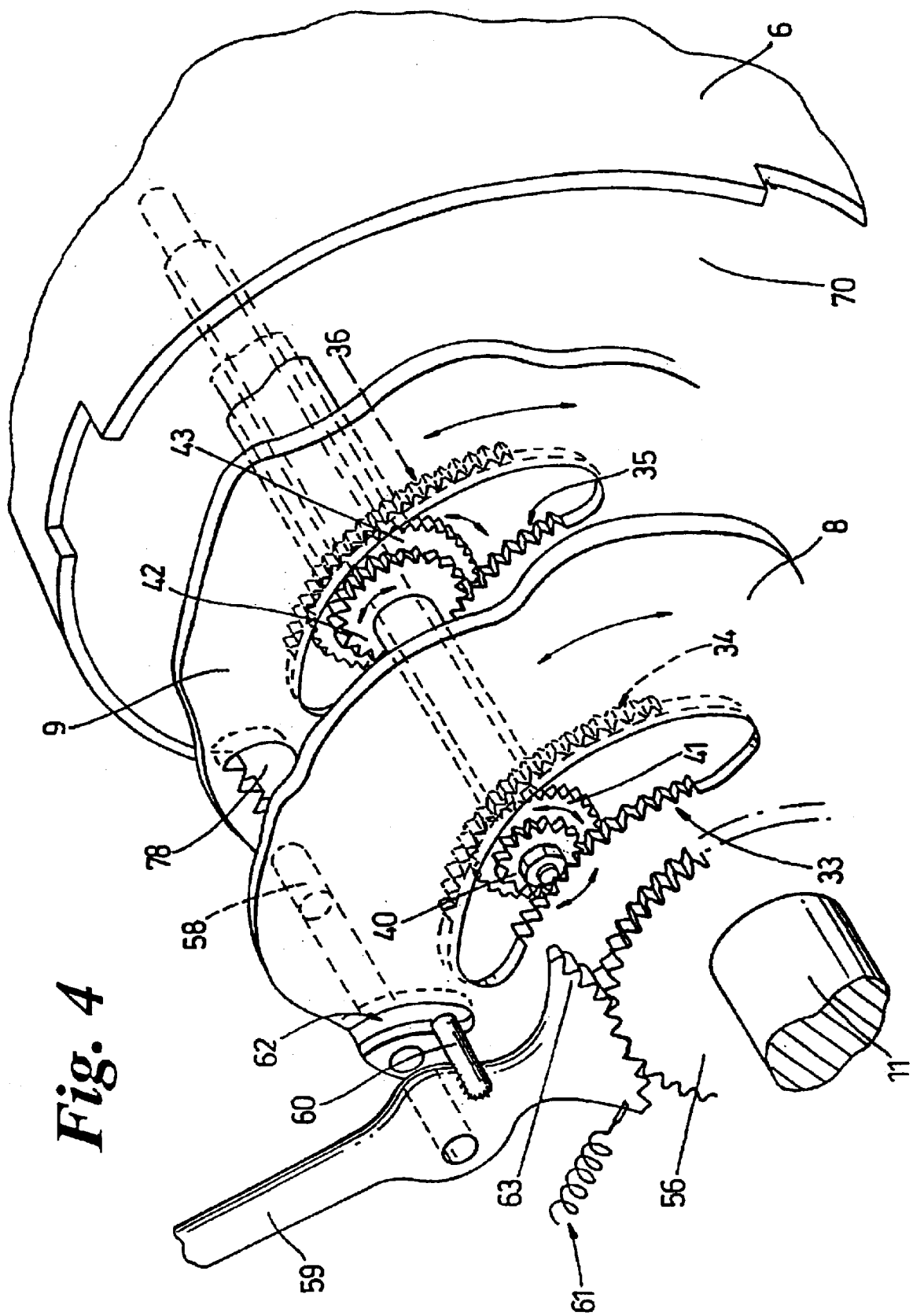
Figure 5:
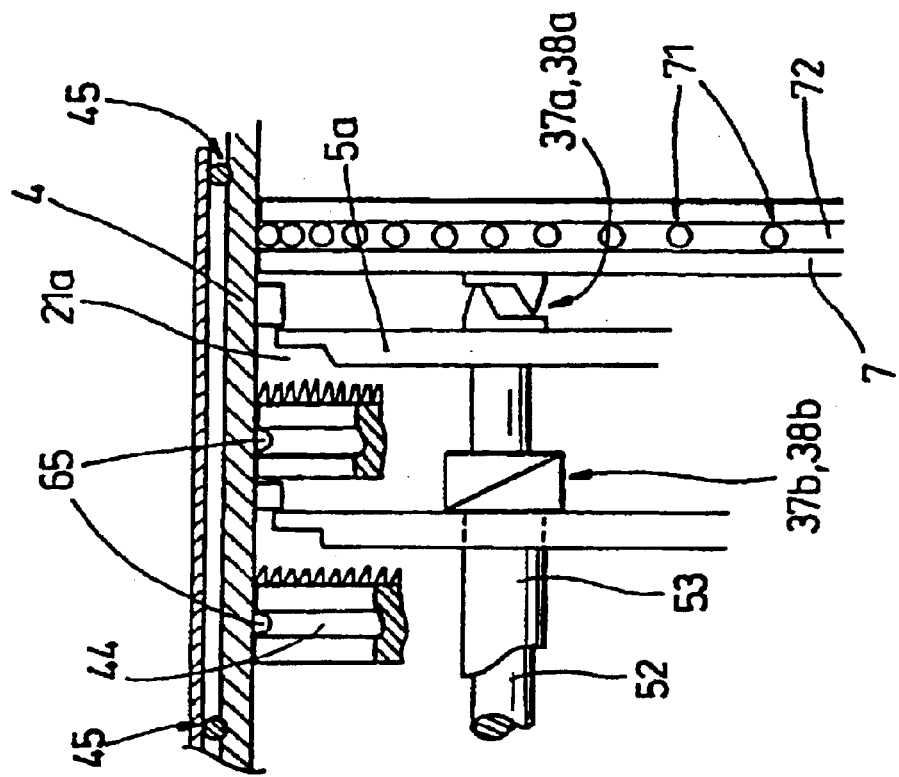
Figure 5:
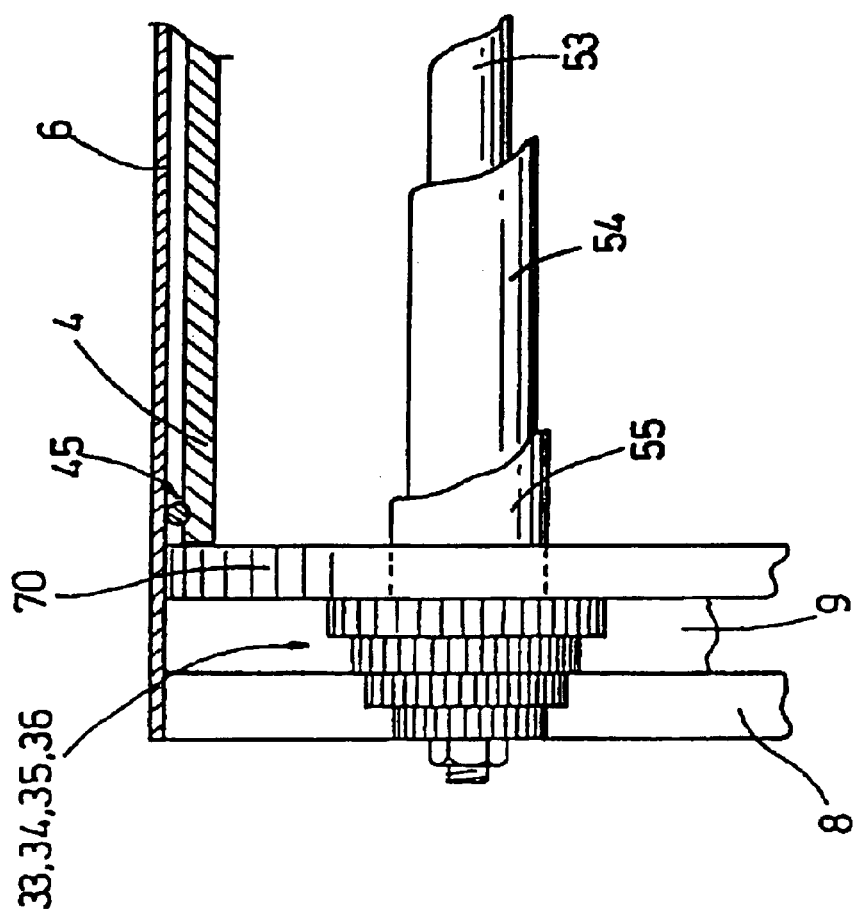
Figure 6:
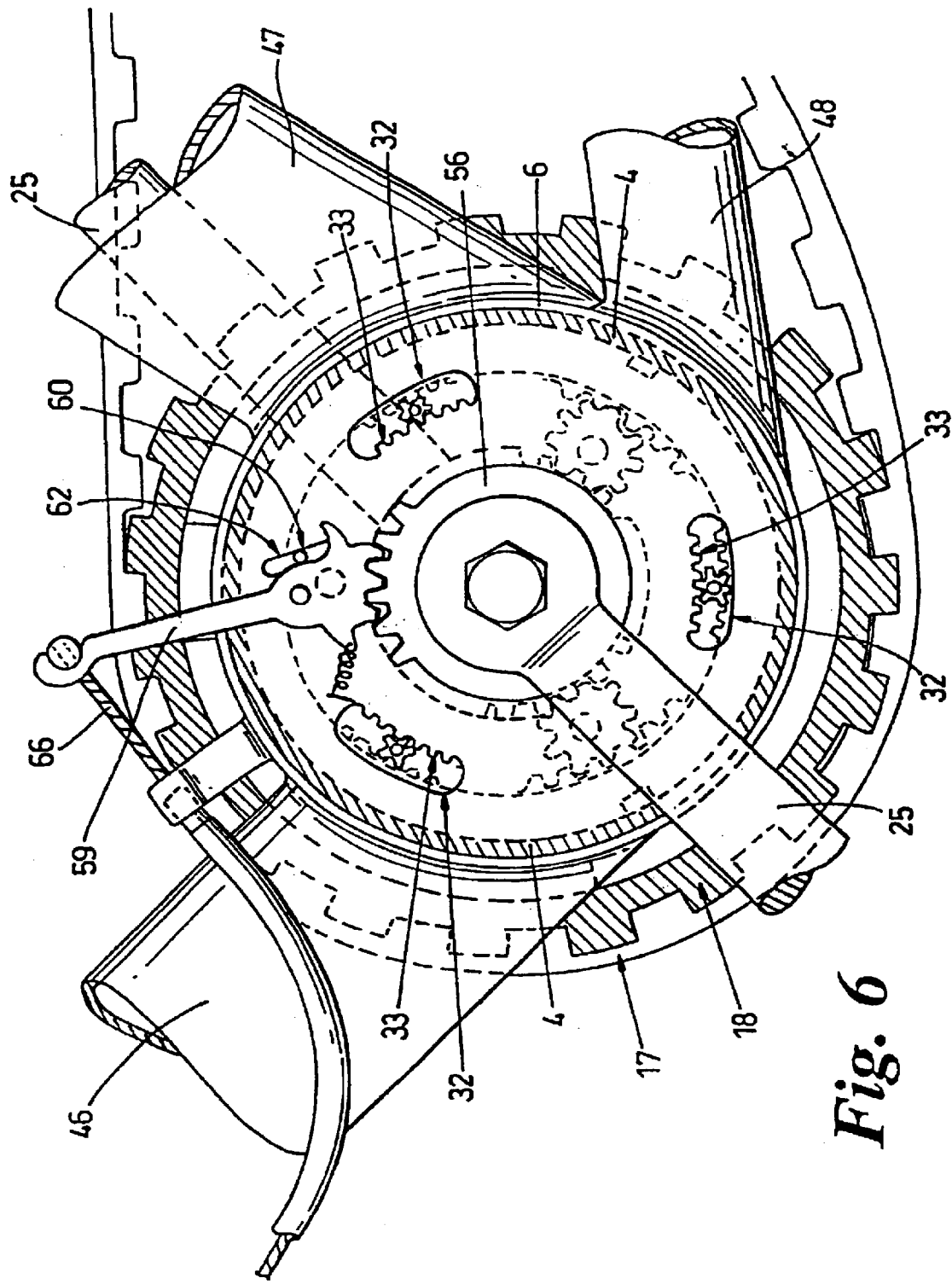
Figure 7:
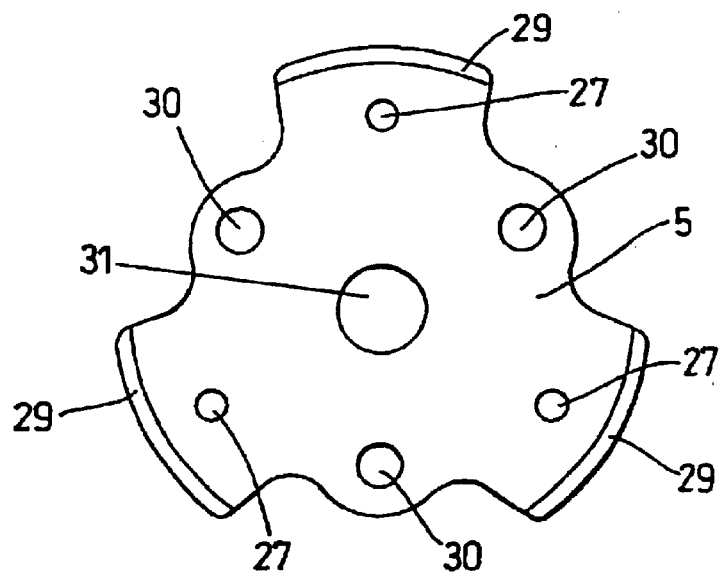
Figure 8:
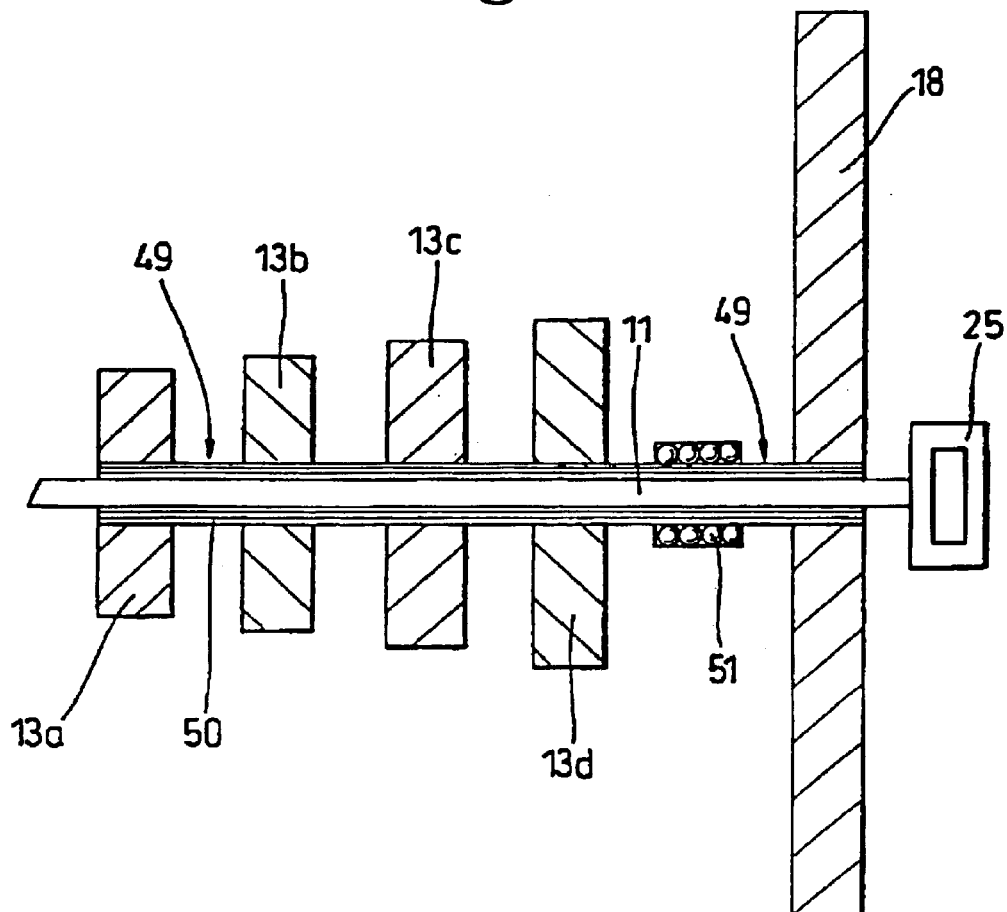
Figure 9:
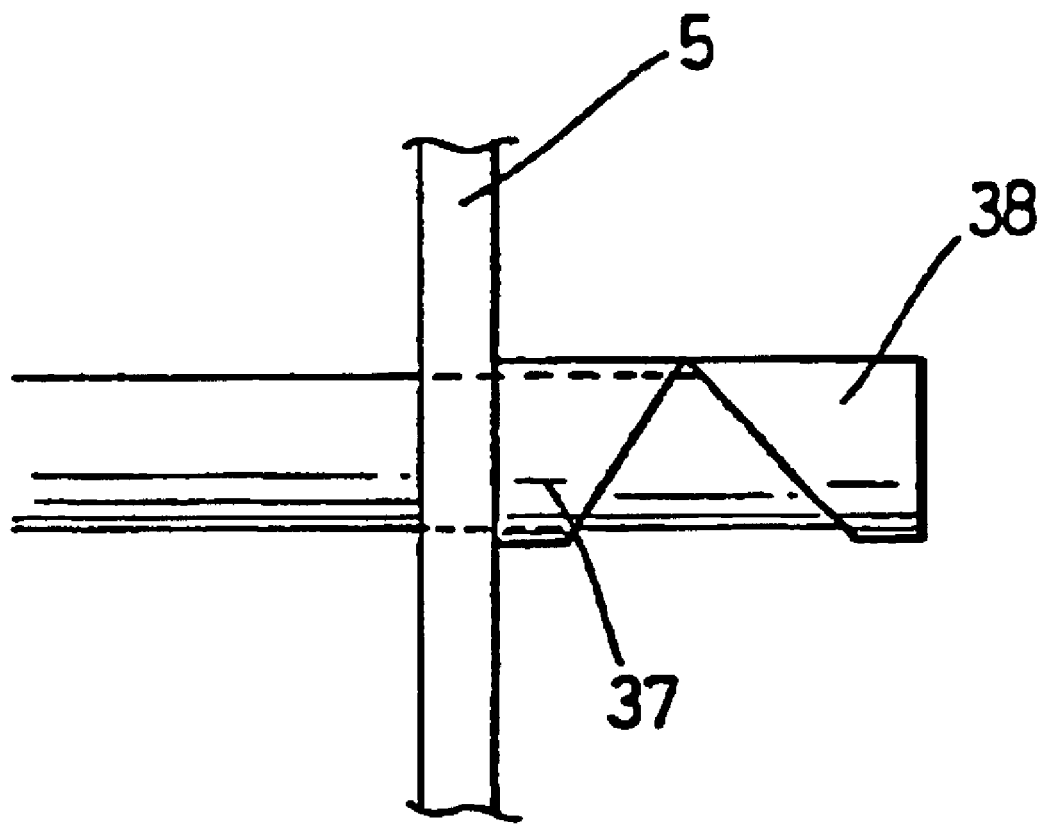
Figure 10:
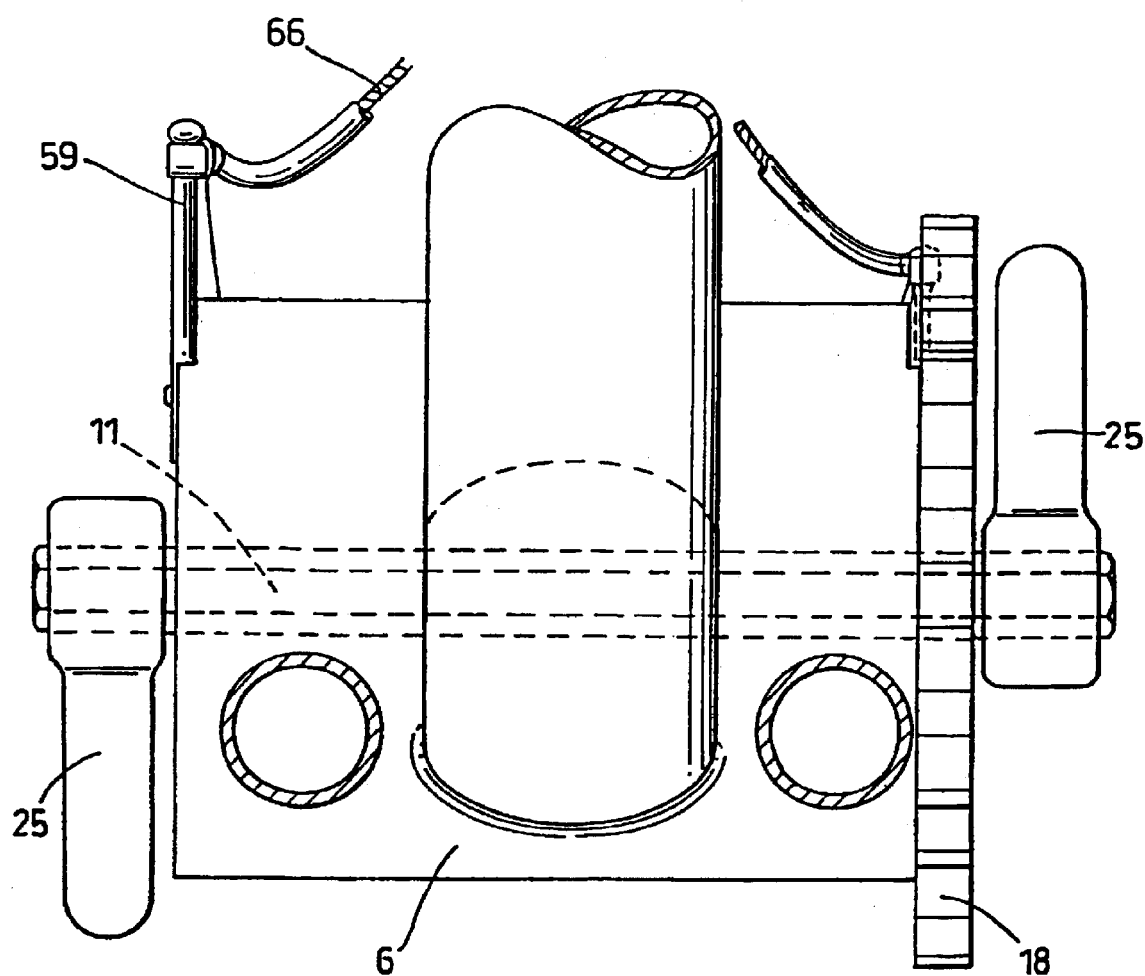
Figure 11:
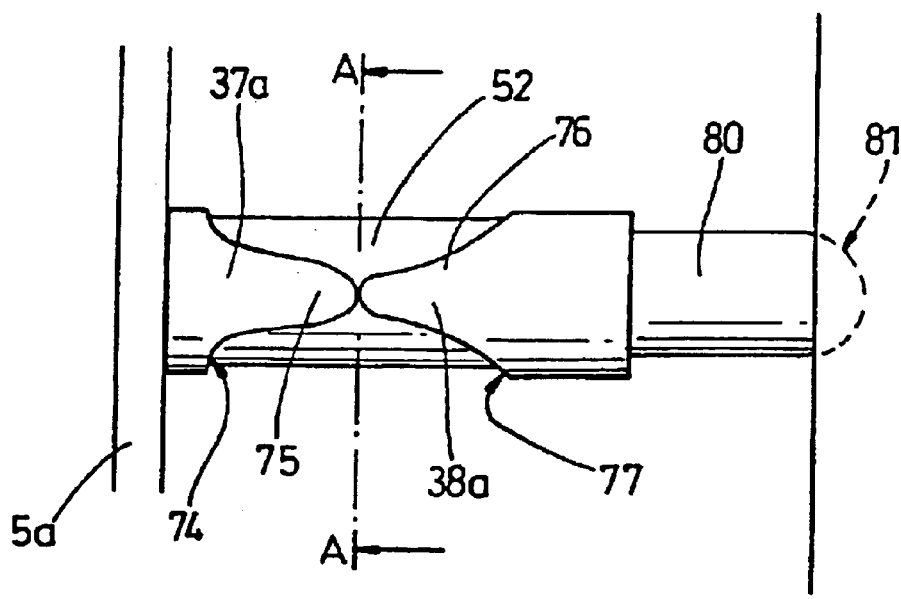
Figure 12:
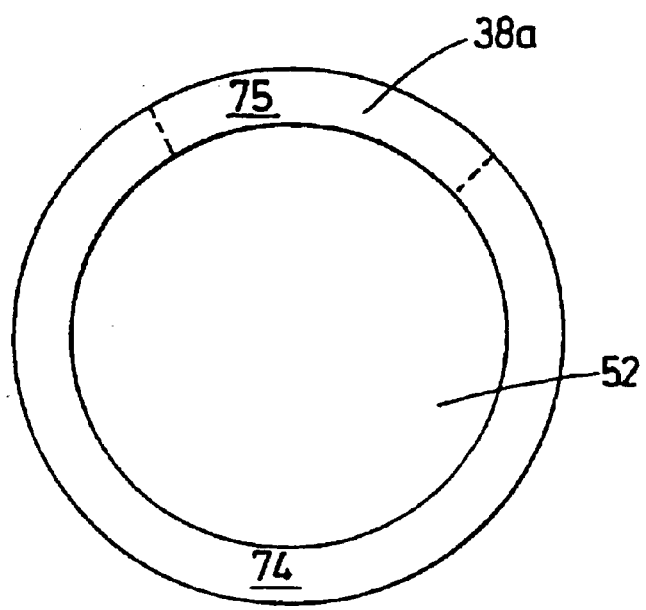

The invention will now be further described, by way of example only, with reference to the accompanying drawings in which:

FIG. 1 is a schematic perspective view of a planetary gear assembly in accordance with the invention, FIG. 2 is a schematic part exploded view of the assembly shown in FIG. 1, FIG. 3 is a schematic exploded view of a gear selection arrangement of the assembly shown in FIGS. 1 and 2, FIG. 4 is a more detailed schematic view of the gear selection arrangement shown in FIG. 3, FIG. 5 is a partial schematic view of the gear selection arrangement of the inventive assembly, FIG. 6 is a schematic end-on view of the planetary gear assembly in situ attached to a bicycle frame, FIG. 7 is an end view of a pressure plate used to engage a planetary gear set in the inventive assembly, FIG. 8 is a schematic cross-section of the arrangement of the secondary sun cogs, FIG. 9 is a schematic side view of two caming portions arranged to engage a planetary gear set, FIG. 10 is a schematic end view of the gear assembly, FIG. 11 is a schematic side view of the innermost caming portions in an engaged condition, and FIG. 12 is a cross-sectional view of a caming portion shown in FIG. 11 on line A—A.

With reference to FIG. 1 (showing only part of the gear selection arrangement for clarity) there is shown a bicycle planetary gear box assembly 1 comprising a plurality of co-axial planetary gear sets. More particularly there are provided four primary gear sets and four secondary gear sets (FIG. 1, for reasons of clarity showing only one primary set 2 and one secondary gear set 3). A gear selection arrangement (hereinafter described) allows the rider to select a primary gear set and a secondary gear set, the torque produced by rotation of the foot pedals driving the selected primary gear set 2, the output from which is transmitted to drive the selected secondary gear set 3 through a rotatably mounted housing 4, and the output from the second gear set 3 being transmitted to rotate the drive cog 18. The drive cog 18 engages with a toothed belt 17 which drives the rear wheel of the bicycle.

With reference to the primary gear set 2 shown in FIG. 1, each planetary gear set comprises a sun cog 13, three planet cogs 14 and an outer cog 15. The relative diameters of the sun cogs and the planet cogs for each gear set will of course be different so that various gear ratios between primary and secondary gear sets may be obtained. Both the primary and secondary gear sets are co-axial with a pedal shaft 11 which is rigidly secured at each distal end to a pedal crank 25 and a pedal 24.

With regard in particular to the primary gear sets, the sun cogs thereof are rigidly secured to the pedal shaft 11. Each primary and secondary outer cog is provided with axially engageable teeth 19 and circumferential groove 44 provided on the radially outermost surface of the outer cog. Each groove 44 accommodates an annular guide 65 which is fast with the inner surface of the cylindrical housing 4 and on which each outer cog may rotate freely.

The cylindrical housing 4 is free to rotate on bearings which are provided between said housing 4 and a housing 6, the housing 6 being fixed to bicycle frame members 46, 47 and 48 (best shown in FIG. 6). A central plate 7 divides the primary side from the secondary side, the plate 7 being rotatably mounted within the cylindrical housing 4 by bearings 71 which are accommodated in a groove 72. The primary and secondary gear sets are enclosed by two end portions 70 which are located towards the distal end of the housing 6.

With reference to the schematic representation of FIG. 8, in which the gear selection arrangement has been omitted, the arrangement of the secondary sun cogs will be explained. The four secondary sun cogs 13a, 13b, 13c and 13d and the drive cog 18 are fixedly attached to a sleeve 49. The sleeve 49 encloses the pedal shaft 11 is radially separated therefrom by phosphorous bushing 50. The pedal shaft 11 is thus free to rotate within the sleeve 49. The sleeve 49 is rotatably mounted by bushing 50 and roller bearings 51. As is evident from FIG. 8 the secondary sun cogs are of different diameters so as to produce, different gear ratios for each secondary gear set.

The gear selection arrangement of the assembly will now be described. Each planetary gear set (both primary and secondary) is provided with an associated engagement ring 21 which is located adjacent to and inwardly of the respective planetary gear set. Each engagement ring 21 comprises a set of axially engageable teeth 28, an annular shoulder 26 and three equally angularly spaced recesses 20. The recesses 20 accommodate three guides 16 which are fast with the rotatably mounted cylindrical housing 4. Each engagement ring 21 is thus capable of axial movement along the respective guides 16 within the housing 4.

Each engagement ring 21 has an associated pressure plate 5. With reference in particular to FIG. 7, each pressure plate 5 comprises an arcuate abutment surface 29, three upstanding equally angularly spaced pins 27 and three equally angularly spaced apertures 30, a central aperture 31 and three caming portions 37, the caming portions being provided on the opposite surface of the pressure plate that on which the pins 27 are provided.

The caming portions of the innermost pressure plates 5a are referred to by reference numeral 37a and the caming portions of the outer pressure plates, 5b, 5c and 5d are referred to by reference numerals 37b, 37c and 37d respectively.

The caming portions 37b, 37c and 37d are of part cylindrical shape and extend generally orthogonal to each respective pressure plate. The outer rims of caming portions 37b, 37c and 37d are of inclined profile when viewed side on (as best shown in FIG. 5).

With reference to FIG. 11, the caming portions 37a comprise a relatively narrow raised portion 75 of part cylindrical shape.

The arcuate abutment surfaces are formed so as to abut with the annular shoulder 26 of the respective engagement ring 21 and such abutment is such as to allow for rotational movement of the engagement ring 21 with respect to the pressure plate 5.

The pins 27 are formed so as to rotatably mount the planet cogs of the respective planetary gear set.

The central aperture 31 is so dimensioned so as to accommodate the pedal spindle 11 and in the case of the pressure plates on the secondary side, to accommodate both the sleeve 49 and the pedal spindle 11 which passes therethrough.

With reference to FIGS. 3, 4 and 5 the gear selection arrangement further comprises an outer plate 8 and an inner plate 9 at each end of the assembly 1, corresponding to the primary and secondary gear sets, three clusters of pinions 10 and a plurality of elongate members 52, 53, 54 and 55 which are connected to respective pinions.

Each plate 8 and 9 is provided with three substantially arcuate apertures 32. As best seen in FIG. 4, the radially inner region of each of the apertures of the plates 8 and 9 comprises an arcuate rack of teeth 33 and 35 respectively. Axially spaced from the rack 33, the radially outer region of each of the apertures of the plates 8 and 9 comprises racks 34 and 36 respectively which are axially spaced from racks 33 and 35 respectively. Thus each plate 8 and 9 each comprises three pairs of axially spaced arcuate racks.

Each cluster of pinions 10 comprises four coaxial pinions 40, 41, 42 and 43 (from the outermost to the innermost pinion) which are accommodated by the apertures 32 and which engage with the racks 33, 34, 35 and 36 respectively.

Each pinion is rigidly attached to an elongate member which extends inwardly of the assembly 1. More specifically the pinion 40 is attached to rod 52 and the pinions 41, 42 and 43 are attached to sleeves 53, 54 and 55 respectively. As is evident from FIG. 5 the rod 52 and the sleeves 53, 54 and 55 are of progressively larger diameter respectively. Thus sleeve 55 enclosed part of sleeves 54, 53 and rod 52, sleeve 54 encloses part of sleeve 53 and rod 52 and sleeve 53 encloses part of rod 52. Around each of the rod 52 and the sleeves 53, 54 and 55 there is provided a caming portion, shown generally as 38, which complements and co-operates with the facing rim of the caming portion 37 of each respective pressure plate 5. Thus, in FIG. 11 the caming portion 38a is attached to the rod 52 and co-operates with the outer facing rim of the caming portion 37a.

End portions 80 of each of the rods 52 are accommodated in recesses 81 provided in the central plate 7.

Returning to the plates 8 and 9, the outer plate 8 has affixed thereto a disc 56 which comprises teeth 57. The teeth 57 mesh with the teeth of lever 59, the lever 59 being pivotally mounted on pin 58 which is attached to the inner plate 9. The lever comprises a lug 60 which may move in curved aperture 62 which is provided in the outer plate 8.

The operation of the planetary gear assembly 1 will now be described. The rotation of the pedals causes rotation of the pedal shaft 11. This in turn causes the sun cog of the selected primary gear set to rotate which rotates the three planet cogs about the pins 27 of the respective pressure plate. The outer cog is caused to rotate and hence the respective engagement ring rotates, which causes the housing 4 to rotate. The housing 4 is rotatably fixed to the engagement rings on the secondary side so that the outer cog of the selected secondary planetary gear set is caused to rotate. This rotation is transmitted through the planet wheels of the selected secondary planetary gear set and to the respective sun wheel which through sleeve 49 drives the drive cog 18. It will be appreciated that those planetary gear sets in the primary and secondary sides which have not been selected at any one time rotate on the respective annular guides 65.

Should the rider wish to alter the gear ratio then this is achieved as follows. A particular planetary gear set on either the primary or secondary side is engaged by means of rotating the caming portions 38 to a position where the respective pressure plate 5 is urged outwardly of the assembly and in so doing the associated engagement ring 5 is urged along the respective guides 16 towards the respective planetary gear set. The teeth 28 of the engagement ring subsequently engage with the teeth 19 of the planetary gear set so that that planetary gear is selected. The engaged condition of the caming portions 37b, 37c and 37d and 38b, 38c and 38d for selection of a planetary gear set is shown in FIG. 9 and the engagement condition for caming portions 37a and 38a is shown in FIG. 11. Both the primary and secondary gear sets are engaged in this manner.

The rider is provided with two pairs of levers (not shown) on the handlebars of the bicycle. One pair corresponds to the primary planetary gear sets and the other corresponds to the secondary planetary gear sets. In the assembly 1 the lowest gear of each side, either primary or secondary, is the innermost planetary gear set. Thus if either of the lowest gears is selected the innermost caming portions 37a and 38a will be in an engaged condition so that the caming portions 38a co-operate with the caming portions 37a to urge the respective engagement ring 21a into engagement with the, associated planetary gear set. As shown in FIG. 11 the angular orientation of the raised portion 76 of the caming portion 38a corresponds to that of the raised portion 75 of the portion 37a so that the pressure plate 5a is urged axially outwards of the assembly 1. Operation of one of the levers mounted on the handlebars will pull cable 66 which causes the lever 59 to rotate by a predetermined amount and thus rotation of outer plate 8 in a clockwise direction will occur thanks to the meshing of the teeth on lever 59 with teeth on disc 56. The three pairs of the outermost pinions 40 and 41 are thus caused to rotate in opposite senses, whilst the three pairs of pinions 42 and 43 meshing with the racks of the inner plate 9 remain stationary. Such rotation of the pinions 40 results in the caming portions 38a rotating to a position where the raised portions 75 and 76 are no longer aligned and thus the pressure plate 5a moves axially inwards to allow the engagement ring 21a to become disengaged from the respective planetary gear set. In a disengaged condition the raised portion 75 abuts against a shoulder 77 and raised portion 76 abuts against a shoulder 74. At the same time rotation of the pinions 41 causes the caming portions 38b to rotate to an engaged position with respect to caming portions 37b (see FIG. 9) and thus the second planetary gear set is engaged.

A further pull on cable 66 by way of the handlebar mounted lever will engage the lug 60, which is attached to the lever 59, with a recess provided in the aperture 78 provided in the inner plate 9. Thus both the inner plate 9 and the outer plate 8 are caused to rotate anti-clockwise so that the pinion pairs 40 and 41 are rotated in the opposite senses to which they were rotated by selection of the second gear and the pinion pairs 42 and 43 are rotated in opposite senses to each other. This anti-clockwise rotation of the plates will result in the disengagement of the second gear and engagement of the third gear, the caming portions corresponding to third gear adopting an engaged condition. It will be appreciated that on selection of third gear that first and fourth gears remain disengaged and in particular the extent of rotation of the outer plate on selection of the third gear is not sufficient to re-engage first gear and thus the raised portions 75 and 76 remain unaligned.

A further pull on cable 66 will cause plates 8 and 9 to again rotate anti-clockwise so that the caming portions corresponding to the third gear are rotated to adopt a disengaged condition and the caming portions corresponding to the fourth gear are rotated to adopt an engaged condition. It will again be appreciated that this further anti-clockwise rotation of the plate 8 is not sufficient to realign the caming portions corresponding to the first gear set into an engaged condition.

It is also important to note that the caming portions corresponding to second, third and fourth gears are phased i.e. set at different stages of the respective engaged and disengaged cycles of the caring portions to ensure that only one of those gears is engaged at any one time.

Since the assembly 1 comprises four sets of primary gears and four sets of secondary gears a total of sixteen gear ratios are possible.

Springs 23 (located on the inner surface of the inner plate 9) are attached at one end to the plate 9 and at the other to lugs 22 (projecting outwardly from the end portion 70) and a spring 61 is attached at one end to the outer plate 8 and at the other to the lever 59 so that a returning force is provided on controlled release of cable 66 to reselect gear sets in reverse order by the second lever (not shown) mounted on the handlebars.

Although not shown in the accompanying drawings it may be desirable to provide resilient return means for each gear set selection arrangement which acts to urge each engagement ring 21 axially away from the respective planetary gear set so as to ensure disengagement when the caming portions adopt a disengaged condition.

It will be appreciated that although the inventive assembly 1 comprises a plurality of primary gear sets and a plurality of secondary gear sets a modified embodiment may comprise a single primary (or secondary) planetary gear set and a plurality of secondary (or primary) planetary gear sets.

What is claimed is:

1. A planetary gear assembly comprising:

primary planetary gear means and secondary planetary gear means, one of said primary planetary gear means and said secondary planetary gear means comprising a planetary gear set and the other of said primary planetary gear means and said secondary planetary gear means comprising a plurality of co-axial planetary gear sets;

selection means for selecting one of the plurality of co-axial planetary gear sets; and a rotatable housing which is mounted for rotation around the planetary gear sets, wherein a rotational input drives the primary planetary gear means, an output from the primary planetary gear means being transmitted to the rotatable housing, an output from the rotatable housing driving the selected secondary planetary gear means and an output from the selected secondary planetary gear means being transmitted to a rotational output means.

2. A planetary gear assembly as claimed in claim 1 in which the primary planetary gear means comprises an array of planetary gear sets and the secondary planetary gear means comprises a secondary array of planetary gear sets, primary selection means for selecting a primary planetary gear set and secondary selection means for selecting a secondary planetary gear set, wherein the rotational input drives a selected primary planetary gear set, the output from the selected primary planetary gear set being used to drive the selected secondary planetary gear set and the output from the selected secondary planetary gear set being transmitted to the rotational output means.

3. A planetary gear assembly as claimed in claim 1 which is a bicycle planetary gear assembly in which foot pedals drive the primary planetary gear means and the output from the secondary planetary gear means is used to drive a drive cog.

4. A planetary gear assembly as claimed in claim 1 wherein the primary planetary gear means is co-axial with the secondary planetary gear means.

5. A planetary gear assembly as claimed in claim 4 wherein the rotatable housing is substantially cylindrical.

6. A planetary gear assembly as claimed in claim 5 wherein the housing substantially encloses the primary and secondary planetary gear means.

7. A planetary gear assembly comprising:

primary planetary gear means and secondary planetary gear means, one of said primary planetary gear means and said secondary planetary gear means comprising a planetary gear set and the other of said primary planetary gear means and said secondary planetary gear means comprising a plurality of co-axial planetary gear sets;

selection means for selecting one of the plurality of co-axial planetary gear sets;

a rotatable housing which is mounted for rotation around the planetary gear sets, wherein a rotational input drives the primary planetary gear means, an output from the primary planetary gear means being transmitted to the rotatable housing, an output from the rotatable housing driving the secondary planetary gear means and an output from the secondary planetary gear means being transmitted to a rotational output means; and gear engagement means associated with each of said plurality of co-axial gear sets, the gear engagement means and the plurality of planetary gear sets being arranged for relative translation movement in a direction which is substantially parallel to the axis of the plurality of the planetary gear sets, and the arrangement of the planetary gear assembly being such that, in use, the relative translation movement brings a selected one of the plurality of planetary gear sets into engagement with a respective one of the gear engagement means, and said respective one of the gear engagement means acts at least in part as a rotational transmission means between said primary gear set and said secondary gear set.

8. A planetary gear assembly as claimed in claim 7 in which the assembly comprises caming means which is operative to cause the relative translational movement of said planetary gear set and said respective gear engagement means.

9. A planetary gear assembly as claimed in claim 8 in which the caming means is adapted to effect the relative translational movement of said planetary gear set and said respective gear engagement means by a rotational movement of said caming means.

10. A planetary gear assembly as claimed in claim 8 in which the assembly comprises a rack and pinion arrangement, and in use, suitable movement of the rack effects rotation of the pinion which causes the relative translational movement of said planetary gear set and said respective gear engagement means.

11. A planetary gear assembly as claimed in claim 10, in which the rack is arcuate.

12. A planetary gear assembly as claimed in claim 10, in which the pinion is connected to said earning means by shaft means which extends inwardly of the planetary gear assembly.

13. A planetary gear assembly as claimed in claim 10, in which the pinion is connected to the caming means and in use sultable movement of the rack effects rotation of the pinion which causes rotation of the caming means.

14. A planetary gear assembly as claimed in claim 13, in which the assembly comprises a plurality of rack and pinion arrangements each corresponding to a respective one of the planetary gear sets.

15. A planetary gear assembly comprising:

primary planetary gear means and secondary planetary gear means, one of said primary planetary gear means and said secondary planetary gear means comprising a planetary gear set and the other of said primary planetary gear means and said secondary planetary gear means comprising a plurality of co-axial planetary gear sets;

selection means for selecting one of the plurality of co-axial planetary gear sets;

a rotatable housing which is mounted for rotation around the planetary gear sets, wherein a rotational input drives the primary planetary gear means, an output from the primary planetary gear means being transmitted to the rotatable housing, an output from the rotatable housing driving the secondary planetary gear means and an output from the secondary planetary gear means being transmitted to a rotational output means;

gear engagement means associated with each of said plurality of co-axial gear sets, the gear engagement means and the plurality of planetary gear sets being arranged for relative translation movement in a direction which is substantially parallel to the axis of the plurality of the planetary gear sets, and the arrangement of the planetary gear assembly being such that, in use, the relative translation movement brings a selected one of the plurality of planetary gear sets into engagement with a respective one of the gear engagement means, and said respective one of the gear engagement means acts at least in part as a rotational transmission means between said primary gear set and said secondary gear set; and caming means which is operative to cause the relative translational movement of said planetary gear set and said respective gear engagement means;

wherein the assembly comprises a rack and pinion arrangement, and in use, suitable movement of the rack effects rotation of the pinion which causes the relative translational movement of said planetary gear set and said respective gear engagement means.

16. A planetary gear assembly as claimed in claim 15, in which the rack is arcuate.

17. A planetary gear assembly as claimed in claim 15, in which the pinion is connected to said earning means by shaft means which extends inwardly of the planetary gear assembly.

18. The planetary gear assembly of claim 15, in which the pinion is connected to the caming means and in use suitable movement of the rack effects rotation of the pinion which causes rotation of the caming means.

19. A planetary gear assembly as claimed in claim 18, in which the assembly comprises a plurality of rack and pinion arrangements each corresponding to a respective one of the planetary gear sets.

20. A planetary gear assembly comprising:

a primary planetary gear assembly and a secondary planetary gear assembly, the gear assemblies each comprising a plurality of co-axial planetary gear sets;

a selection device for selecting a co-axial planetary gear set in the primary planetary gear assembly and a co-axial planetary gear set in the secondary planetary gear assembly; and a rotatable housing for housing the gear assemblies and mounted for rotation around the gear assemblies, wherein the housing is rigidly attached to first and second portions of the selection device such that when the selected co-axial planetary gear set in the primary planetary gear assembly is driven by a rotational input, the first portion of the selection device engaging the primary planetary gear assembly drives the selected co-axial planetary gear set in the secondary planetary gear assembly via the housing and the second portion of the selection device engaging the secondary gear assembly and an output of the selected secondary planetary gear assembly is transmitted to a rotational output means.

* * * * *